Feb. 2, 1937.   J. F. KOCA   2,069,671
SHIFT MECHANISM
Filed March 2, 1933   2 Sheets-Sheet 1
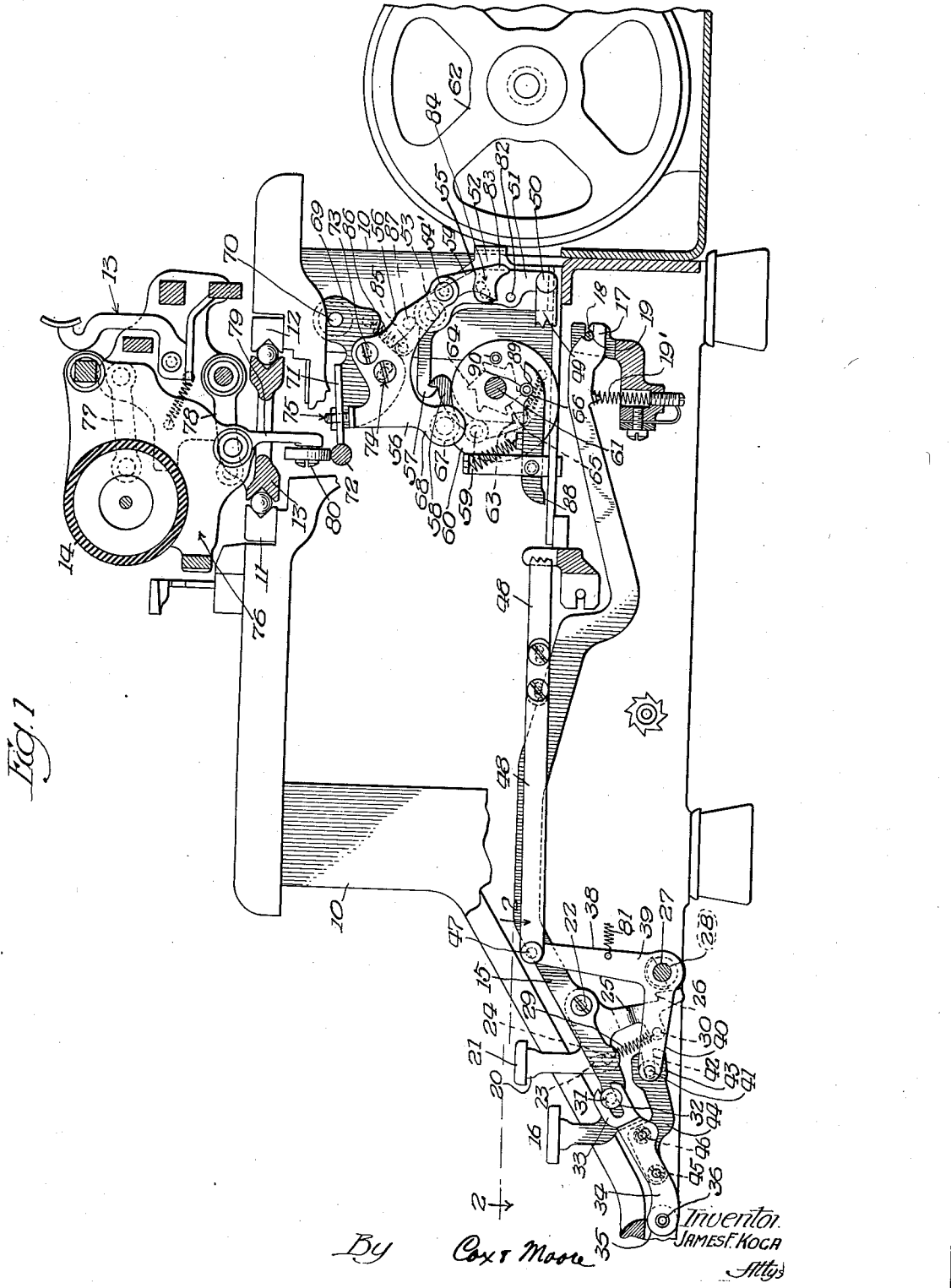
Inventor
JAMES F. KOCA
By Cox & Moore
Attys

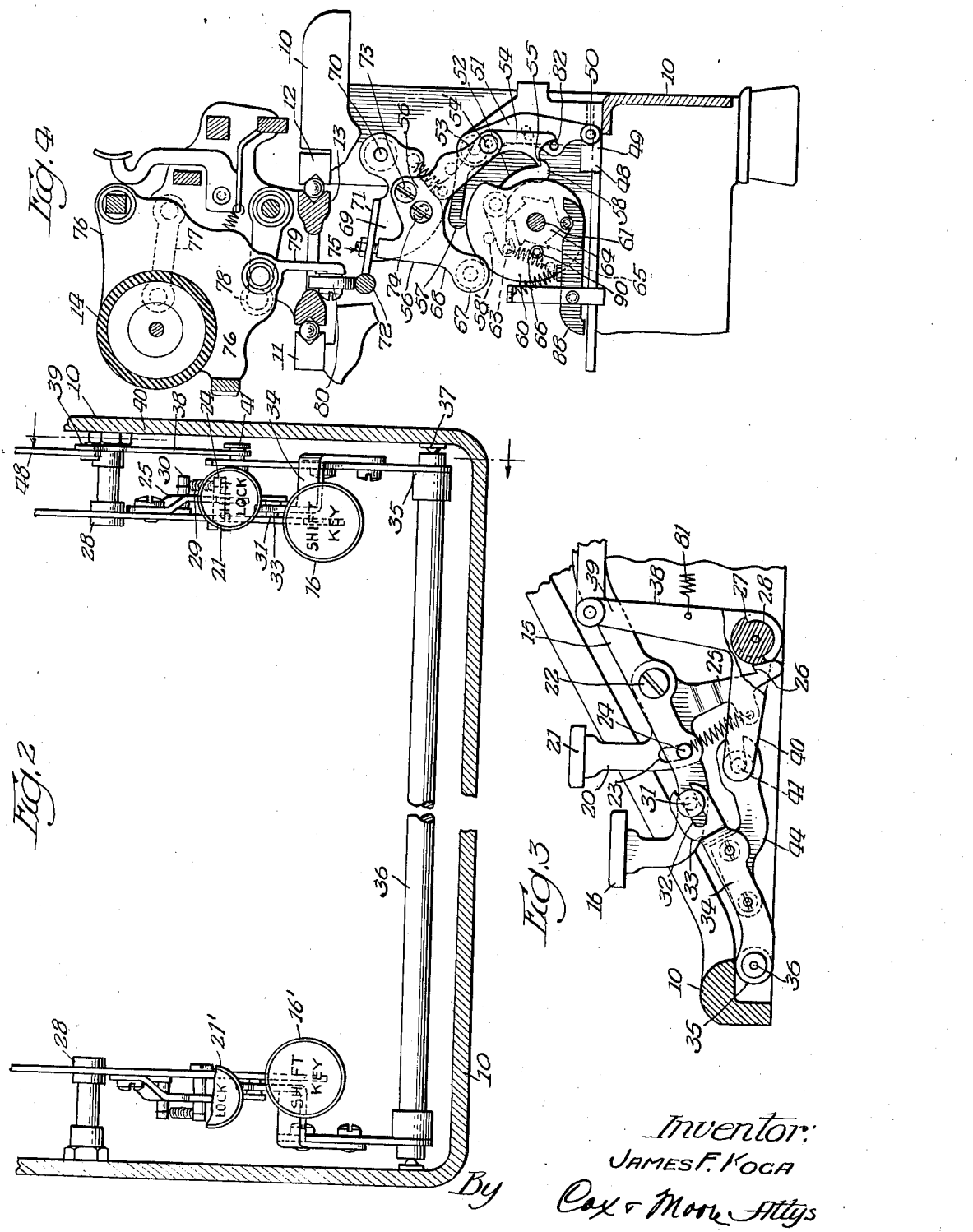

Patented Feb. 2, 1937

2,069,671

UNITED STATES PATENT OFFICE 2,069,671

SHIFT MECHANISM

James F. Koca, Woodstock, Ill., assignor to Woodstock Typewriter Company, Woodstock, Ill., a corporation of Illinois Application March 2, 1933, Serial No. 659,333

9 Claims. (Cl. 197—73)

This invention relates to typewriters and particularly to shift mechanism. More specifically the invention relates to shift mechanism for electrically operated typewriters.

The primary object of the present invention is to provide new and improved shift mechanism for electrically positioning the carriage and consequently the platen relative to the type bar upon the depression of a single key lever.

Another object of the invention is to provide electrically controlled and operated shift mechanism for shifting a platen relative to the type on a type bar upon the depression of a shift key as well as shift lock mechanism cooperating with the shift key for locking the shift key in shifted position.

A further object is to provide simple, efficient, and positive electrically operating mechanism for positioning the carriage and the platen to shifted position and for maintaining the carriage in such shifted position.

A still further object is to provide a new and novel arrangement of parts including a continuously rotating shaft cooperating with certain correlated parts and controlled by shift key mechanism to control the movement of the carriage and platen to and from shifted position.

Numerous other objects and advantages will be apparent throughout the progress of the following specification.

The accompanying drawings illustrate a selected embodiment of the invention and the views therein are as follows:

Fig. 1 is a transverse sectional view through a typewriter and embodying the invention, the parts being in their normal initial position.

Fig. 2 is a detail plan section looking in the direction of the arrows 2—2 of Fig. 1.

Fig. 3 is an enlarged detail sectional view of some of the key shifting mechanism shown in Fig. 1.

Fig. 4 is a detail sectional view similar to Fig. 1 but showing the parts in an advanced or shifted position.

The typewriter to which the invention appertains has a frame 10 which supports the front and rear carriage rails 11 and 12 respectively, Figs. 1 and 4, which support the carriage 13. The particular typewriter herein shown is a "Woodstock" typewriter and, in general, the parts including the frame, type bars, platen, and others are standard in Woodstock machines, and the various parts will not be described except in conjunction with those required for electrically shifting the carriage and platen.

The typewriter has a platen 14 which is supported on the carriage 13 and may be shifted by a shift lever 15 having a shift key 16. The end 17 of the shift key has a pivotal connection with a pin 18 as indicated at 19, Fig. 1. The shift key is normally resiliently held in normal position so that after depression, the spring 19' will return the key lever to initial position. A shift lock lever 20 having a key 21 is pivoted to the shift lever 15 as indicated at 22. The lever 20 has a slot 23 which is engaged by a pin 24 on the lever 15. The lever 20 has a tail-piece 25 carrying a locking latch or pawl 26, which pawl is adapted to engage a rigid keeper member 27 on a stud 28. A spring 29 is connected to the pin 24 and to an end 30 on the projection or tail-piece 25 and urges the lock lever 20 in a predetermined position to hold the lock lever in initial and normal up position. The shift key and the shift lock are conventional with Woodstock typewriters, and from the description so far given it can be seen that depression of the shift key will carry with it the shift lock lever, but the shift lock lever will not be locked in position. However, when the shift lock key is depressed, the pawl or latch 26 will engage with its keeper 27 and hold the shift key in locked or shifted position and will so remain until released by the depression of the shift key. Depression of the shift key, due to the pin 24 engaging the slot 23, will swing the lever 21 on its pivot 22 a predetermined amount sufficient to release the pawl 26 from the catch 27. The shift lever 15 carries a pin 31 which has limited engagement in the slot 32 of the bifurcated end 33 on the offset arm or bracket 34. This arm or bracket is fixed, as indicated at 35, to a transverse rod 36 which has its ends revolubly mounted in the frame 10 as indicated at 37. A second shift key 16' and a second shift lock 21' are connected to the transverse rod 36 in the same manner just described, and these two keys are connected and operated by parts exactly the same as those previously described. The only difference is that the first described shift key and shift lock are mounted on the right hand side of the machine. Thus, when one shift key is depressed, the other key will also be depressed due to the connection with the rod 36. Also, depression of one shift lock key will lock the shift key and both shift keys will be held in downward or shifted position until either one of the shift keys is depressed to disengage the pawl 26 from its respective keeper 27.

A bell-crank 38 is pivoted to the stud 28 and has arms 39 and 40. The arm 40 carries a pin 41 which fits in a slot 42 formed in the bifurcated end 43 of an arm 44. The arm 44 is connected to the offset arm or bracket 34 as indicated at 45 and 46. The upper end of the arm 39 of the bell-crank 38 is pivoted at 47 to an adjustable link 48. Therefore, when either a shift key 16 or a shift lock 21 is depressed, the bell-crank 38 will swing on its pivot and move the link 48 to the left, Fig. 1.

The end 49 of the link 48 is pivoted at 50 to a latch 51 which is pivoted to a bracket 52 as indicated at 53. A second latch 54 carrying a projection 55 is pivoted to the adjustable arm 56 as indicated at 54'. The latch 51 carries a locking pawl 57 which is adapted to become latched or engaged with a pawl 58 which is pivoted at 59 to a cam member 60.

The cam member 60 is revolubly mounted on a shaft 61 which is continually rotated by means, not shown, from a motor 62. The pawl 58 has a latching end 63 which is adapted to be thrown into engagement with upstanding teeth 64 on a ratchet member 65 to lock the cam 60 to the shaft 61 and cause the cam to rotate therewith. A spring 66 is fastened to the tail-piece of the pawl 58 and urges this pawl in a predetermined direction and normally into engagement with the pawl 57. A pawl stop 58' limits the movement of the pawl 58 in a predetermined direction. Thus, when a shift key or a shift lock key is depressed, the link 48 will swing the latch 51 on its pivot 53 and cause disengagement of the pawl 57 from the pawl 58, thereby permitting the spring 66 to pull the engaging end 63 of the pawl 58 into position to be engaged by the rotating ratchet 64 and thereby lock the cam 60 to the shaft 61. A cam follower 67 is carried by an extension 68 of the adjustable arm 56 which is adjustably fastened to the bracket 69. The bracket 69 is pivoted at 70 to part of the main frame 10. Therefore, the weight of the bracket 69 and the adjustable arm 56 is supported on the periphery of the cam 60 by the cam follower or roller 67.

During rotation of the cam, as previously described, the cam 60 will cause the bracket 69 and consequently the adjusted arm 56 to have swinging movement on the pivot 70. The bracket 69 has a flange 71 upon which a longitudinal bar or rod 72 has one end fixed. The other end of the bar or rod 72 is supported in a second bracket 69 located at the left hand side of the machine. The adjustable arm 56 is pivoted to the bracket as indicated at 73, and a slot and screw connection 74 holds the adjustable arm 56 in adjusted position relative to the bracket 69. The adjustment of the arm 56 is made by the nut and screw connection indicated generally by the numeral 75. Thus, when a shift key 16 or a shift lock key 21 is depressed, the link 48 will swing the latch 51 on its pivot 53 and release the pawl 57 from engagement with the pawl 58 at which time the spring 66 will cause the latch end 63 of the pawl 58 to come into locking engagement with a tooth 64 on the ratchet 65 and cause rotation of the cam 60. This rotation of the cam will cause the adjustable arm 56 to swing in a clockwise direction on the pivot 70 and raise the platen support 76.

The platen support 76 is fastened to the carriage 13 by upper and lower links 77 and 78 respectively. An arm 79 fixed to the platen support 76 carries a roller 80 which rests on the longitudinal bar or rod 72. Therefore raising or lowering movement of the bar 72 causes similar movement of the platen support relative to the carriage, permitting the proper type on the type bar to be shifted to printing impression.

During the swinging movement of the adjustable arm 56, the projecting latch end 55 of latch member 54 will be swung to the left, Fig. 1, to bring the latch end 55 into locking engagement with the pawl 58, thereby releasing the latching member 63 from the ratchet 65. The cam will thus cease rotating and the carriage support 76 will be held in raised position as long as the link 48 is held in shifted position. The link 48 may be held in shifted position either by continually depressing the shift key 16 or by locking engagement of the shift lock key 21. Upon release of either the shift key 16 or the shift lock key 21, the spring 19' or an additional spring 81, which is fastened to the bell-crank 38, will cause these keys to return to up or normal position causing the link 48 to push the latch 51 in a counter-clockwise position and cause the pin 82 to engage the end 83 of the latch 54 and disconnect the latching end 55 of latch 54 from the pawl 58. A pin and slot connection 84 in the bracket 52 and the latch 51 respectively limits the movement of the latch 51. Upon release of the latching end 55 from the pawl 58, the latching end 63 of the pawl 58 will again become engaged with the rotating ratchet 65 and cause the cam to again rotate with the shaft 61 until the pawl 58 becomes engaged with the pawl 57. Upon engagement of these two pawls, the latching end 63 will again become disengaged from the ratchet 65 and the parts will return from the shifted position shown in Fig. 4 to normal initial position shown in Fig. 1. The latch 54 has a tail-piece 85 to which a spring 86 is fastened to normally hold the tail-piece against a pin 87 on the arm 56. Therefore, the latch 54 is resiliently held in proper operative position and provides a flexible connection for these members.

A detent 88 is provided with a recess 89 to engage pins 90 on the cam to assist in holding the cam in either the position shown in Fig. 1 or Fig. 4.

The invention provides improved and relatively simple means controlled by the depression of a single shift key for mechanically shifting the platen by electrically operated means to bring the platen in proper position relative to a type bar. The parts constituting the invention are simple but rigid in construction, efficient in operation and require very little space. The parts are properly proportioned and timed so that the operation is performed at the proper time.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In a typewriter, a carriage, a platen movably supported on the carriage, a shaft adapted to be rotated, a cam freely mounted on the shaft, a shift lever, means connecting the shift lever and cam to lock the cam to the shaft during depression of the shift lever, means constantly engaging the cam and operatively connecting the cam to the platen to shift the latter when the cam is locked to the shaft, means controlled by movement of the cam engaging means for unlocking the cam from the shaft and means for returning the parts to initial position after the shifting of the platen.

2. In combination with an electrically driven typewriter having a drive shaft and type bars driven by said drive shaft, an auxiliary shaft adapted to be rotated, a cam freely mounted on the shaft, a depressible shift lever, means controlled by the shift lever to lock the cam to the shaft and cause rotation of the cam, means constantly engaging the cam and cooperating with the platen and operated by the cam for shifting the platen, means controlled by the platen shifting means for unlocking the cam from the shaft, and means for returning the parts to initial position, said platen being operated and returned to initial position during a single rotation of the cam.

3. In combination with an electrically driven typewriter having a drive shaft and type bars driven by said drive shaft, an auxiliary shaft adapted to be rotated, a cam freely mounted on the shaft, a depressible shift lever, means controlled by the shift lever to lock the cam to the shaft and cause rotation of the cam, means constantly engaging the cam and cooperating with the platen and operated by the cam for shifting the platen, means controlled by the platen shifting means for unlocking the cam from the shaft, and means for returning the parts to initial position, said platen being operated and returned to initial position by a single rotation of the cam, and a shift lock for locking the shift lever in depressed position to cause the platen to be maintained in shifted position.

4. In combination with an electrically driven typewriter having a drive shaft and type bars driven by said drive shaft, a continuously rotating auxiliary shaft, a cam freely mounted on the auxiliary shaft, a ratchet fixed to the auxiliary shaft, a locking pawl carried by the cam, a shift lever, means controlled by the depression of the lever to cause engagement of the pawl with the ratchet and cause the cam to rotate with the auxiliary shaft, a platen, means constantly engaging the cam and cooperating with the platen and operated by the rotation of the cam to shift the platen, and means carried by the cam operated means for releasing the pawl from the ratchet and preventing further rotation of the cam, and means for returning the parts to initial position after the shifting of the platen, said platen being operated and returned to normal position during only one operation of the cam.

5. In a typewriter, a carriage, a platen shiftably supported on the carriage, a power operated rotary member, a rotatably mounted cam, means for rotating the cam from said member, means engageable with the cam for shifting the platen, and means controlled by the shifting means for unclutching the cam and rotary member after a partial revolution of the cam, said shifting means being operable during the greater portion of a single revolution of the cam to shift the platen from normal to shifted position and being operable during the remainder of said cam revolution to return the platen to normal position.

6. In a typewriter, a carriage, a platen shiftably supported on the carriage, a power operated rotary member, a rotatably mounted cam, means for clutching the cam to said member for rotation therewith, means engageable with the cam for shifting the platen, and means controlled by the shifting means for unclutching the cam and rotary member after a partial revolution of the cam.

7. In a typewriter, a carriage, a platen shiftably supported on the carriage, a power operated rotary member, a rotatably mounted cam, yieldable means for holding the cam in its normal position, means for clutching the cam to said rotary member for rotation therewith, means engageable with the cam for shifting the platen, means controlled by the shifting means for unclutching the cam and rotary member after a partial revolution of the cam, and means for releasably latching the cam in its partially revolved position.

8. In combination with an electrically driven typewriter having a drive shaft, a platen, and type bars driven by said drive shaft, an auxiliary shaft adapted to be rotated, a cam freely mounted on the shaft, a depressible shift lever, means controlled by the shift lever to lock the cam to the shaft and cause rotation of the cam, means cooperating with the platen and operated by the cam for shifting the platen, means controlled by the platen shifting means for unlocking the cam from the shaft, and means for returning the parts to normal position, said platen being operated to shifted position during the greater part of a single operation of the cam and being returned to normal during the remainder of said operation.

9. In a typewriter, a carriage, a platen shiftably supported on the carriage, a power operated rotary member, a rotatably mounted cam, means for clutching the cam to said member for rotation therewith, means engageable with the cam for shifting the platen, means controlled by the shifting means for simultaneously unclutching the cam from the rotary member after a partial revolution of the cam and holding the cam at said partially revolved position, and releasing means associated with the unclutching means for moving the unclutching means out of operative position whereby to allow the cam to move from partially revolved position to its original position.

JAMES F. KOCA.